United States Patent
Ma et al.

(10) Patent No.: US 10,683,459 B2
(45) Date of Patent: Jun. 16, 2020

(54) LIQUID-PHASE HYDROISOMERIZATION SYSTEM AND PROCESS THEREFOR AND USE THEREOF

(71) Applicant: PetroChina Company Limited, Beijing (CN)

(72) Inventors: Shoutao Ma, Beijing (CN); Xiaoqiao Huang, Beijing (CN); Famin Sun, Beijing (CN); Qingfeng Ma, Beijing (CN); Fangming Xie, Beijing (CN); Yongsheng Duan, Beijing (CN); Xianjun Wu, Beijing (CN); Fengxuan Li, Beijing (CN); Dongmei Ge, Beijing (CN); Endong Xia, Beijing (CN); Ruifeng Li, Beijing (CN); Ronglei Ji, Beijing (CN); Liying Liu, Beijing (CN); Lihong Qin, Beijing (CN); Xiangbin Meng, Beijing (CN); Chunming Dong, Beijing (CN); Xuefeng Lu, Beijing (CN); Rui Wang, Beijing (CN); Tiegang Xu, Beijing (CN); Shurong Ni, Beijing (CN)

(73) Assignee: PetroChina Company Limited, Beijing (CN)

( * ) Notice: Subject to any disclaimer, the term of this patent is extended or adjusted under 35 U.S.C. 154(b) by 94 days.

(21) Appl. No.: 15/748,851

(22) PCT Filed: Jun. 8, 2016

(86) PCT No.: PCT/CN2016/085257
§ 371 (c)(1),
(2) Date: Jan. 30, 2018

(87) PCT Pub. No.: WO2017/101274
PCT Pub. Date: Jun. 22, 2017

(65) Prior Publication Data
US 2018/0223194 A1    Aug. 9, 2018

(30) Foreign Application Priority Data

Dec. 18, 2015  (CN) .......................... 2015 1 0956890

(51) Int. Cl.
*C10G 45/58* (2006.01)
*C10M 177/00* (2006.01)
(Continued)

(52) U.S. Cl.
CPC ............. *C10G 45/58* (2013.01); *C10G 45/72* (2013.01); *C10G 67/02* (2013.01); *C10G 69/02* (2013.01);
(Continued)

(58) Field of Classification Search
CPC ........ C10G 45/58; C10G 67/02; C10G 69/02; C10G 45/72; C10G 2400/10;
(Continued)

(56) References Cited

U.S. PATENT DOCUMENTS 6,589,415 B2 *  7/2003  Smith .................... C10G 65/12
                                                       208/58
6,881,326 B2    4/2005  Ackerson et al.
(Continued)

FOREIGN PATENT DOCUMENTS

CN    101760236 A    6/2010
CN    201644076 U    11/2010
(Continued)

OTHER PUBLICATIONS

International Search Report for International Application No. PCT/CN2016/085257, "Liquid-Phase Hydroisomerization System and Process Therefor and Use Thereof", dated Sep. 21, 2016.

*Primary Examiner* — Randy Boyer
*Assistant Examiner* — Juan C Valencia
(74) *Attorney, Agent, or Firm* — Hamilton, Brook, Smith & Reynolds, P.C.

(57) ABSTRACT

Provided are a liquid-phase hydroisomerization system and a process therefor and use thereof. The system comprises a gas-liquid mixer (3), a hydroisomerization reactor (4) and a fractionating column (6). An oil product and hydrogen are mixed as a liquid hydrogen-oil mixture, and are introduced into the hydroisomerization reactor for a hydroisomerization reaction, and after being fractionated, a target product is led out. A supplemental hydrogen-dissolving inner member is provided at least between a group of two adjacent catalyst bed layers in order to supplement hydrogen to the reactants. The process cancels a circulating hydrogen compressor, has a simple process flow, and can be applied to the production of a lubricant base oil by the hydroisomerization of a lubricant raw material or the production of a low freezing point diesel by the hydroisomerization of and the reduction in the freezing point of a diesel raw material.

19 Claims, 1 Drawing Sheet

(51) Int. Cl.
  *C10G 67/02* (2006.01)
  *C10L 1/08* (2006.01)
  *C10M 101/02* (2006.01)
  *C10G 45/72* (2006.01)
  *C10G 69/02* (2006.01)

(52) U.S. Cl.
  CPC ............ *C10L 1/08* (2013.01); *C10M 101/02* (2013.01); *C10M 177/00* (2013.01); *C10G 2300/1011* (2013.01); *C10G 2300/1055* (2013.01); *C10G 2300/1062* (2013.01); *C10G 2300/42* (2013.01); *C10G 2400/04* (2013.01); *C10G 2400/10* (2013.01); *C10M 2203/1025* (2013.01); *C10N 2220/022* (2013.01); *C10N 2230/02* (2013.01)

(58) Field of Classification Search
  CPC ............ C10G 2400/04; C10G 2300/42; C10G 2300/1062; C10G 2300/1055; C10G 2300/1011; C10G 2300/1037; C10M 101/02; C10M 177/00; C10M 2203/1025; C10M 2203/0206; C10M 105/00; C10N 2220/022; C10N 2230/02; C10L 1/08
  See application file for complete search history.

(56) References Cited

U.S. PATENT DOCUMENTS

| | | | | |
|---|---|---|---|---|
| 7,276,215 | B2* | 10/2007 | Muller | B01D 3/18 261/110 |
| 7,569,136 | B2 | 8/2009 | Ackerson et al. | |
| 7,803,269 | B2 | 9/2010 | Kokayeff et al. | |
| 8,314,276 | B2* | 11/2012 | Petri | C10G 49/26 422/105 |
| 8,945,372 | B2* | 2/2015 | Dindi | C10G 47/34 208/59 |
| 9,365,781 | B2* | 6/2016 | Dindi | C10G 65/02 |
| 9,499,750 | B2* | 11/2016 | Dindi | C10G 45/22 |
| 9,534,178 | B2* | 1/2017 | Ma | B01J 8/0492 |
| 2009/0095653 | A1 | 4/2009 | Kokayeff et al. | |
| 2014/0124407 | A1* | 5/2014 | Dindi | C10G 65/043 208/57 |
| 2014/0124409 | A1* | 5/2014 | Dindi | C10G 45/22 208/59 |

FOREIGN PATENT DOCUMENTS

| | | |
|---|---|---|
| CN | 103131468 A | 6/2013 |
| CN | 103305267 A | 9/2013 |
| CN | 103773456 A | 5/2014 |
| CN | 103789005 A | 5/2014 |
| CN | 103805240 A | 5/2014 |
| CN | 103965959 A | 8/2014 |
| CN | 204208536 U | 3/2015 |
| CN | 105602649 A | 5/2016 |
| WO | 2012050766 | 4/2012 |

* cited by examiner

LIQUID-PHASE HYDROISOMERIZATION SYSTEM AND PROCESS THEREFOR AND USE THEREOF

This application is the U.S. National Stage of International Application No. PCT/CN2016/085257, filed Jun. 8, 2016, which designates the U.S., published in Chinese, and claims priority under 35 U.S.C. §§ 119 or 365(c) to Chinese Application No. 201510956890.8, filed Dec. 18, 2015. The entire teachings of the above applications are incorporated herein by reference.

TECHNICAL FIELD

The present invention relates to the field of hydrocarbon conversion processes for oils, and more particularly to a liquid-phase hydroisomerization system and process and use thereof.

BACKGROUND ART

With the crude oil becoming increasingly heavier and the demand for clean fuel growing, refineries in various counties have implemented multiple sets of large-scale hydrocracking equipment, and expanded the hydrocracking capacity. Before cracking, hydrofining of raw materials is required to remove non-hydrocarbon impurities like sulfur and nitrogen, which is accompanied by reactions such as saturation, ring-opening, dealkylation and isomerization of aromatic hydrocarbons. Therefore, after hydrocracking of crude oil, the tail oil has a saturated hydrocarbon (mainly C20-C30 n-paraffins) content of 96.8% or more and an aromatic content less than 1%, is characterized by low levels of impurities such as sulfur, nitrogen and metal, can directly undergo hydroisomerization, saving the investment and processing costs during pre-processing of raw materials, and is an excellent raw material for producing medium- and low-viscosity group II and group III base oils. Because of the popularity of hydrocracking equipment, using the tail oil as a raw material to produce lubricant base oils has become a mainstream direction.

Hydrocracking tail oil is an optimal raw material to produce API Group III base oil having low viscosity, a low pour point and a viscosity index greater than 120, but has a high solidification point, a high pour point, a high clouding point, partially hydrogenated aromatics, and poor light stability, which necessitates further saturation of the aromatics after iso-dewaxing. The Chevron Corporation is the first manufacturer in the word that used the post-treatment process of hydrocracking-iso-dewaxing-hydrogenation to produce lubricant base oils, which has been widely used.

Currently, hydroisomerization techniques typically use a three-phase reaction (with gas/liquid/solid catalysts), such as the conventional trickle bed technology, to convert n-paraffins to iso-paraffins. In these systems, the continuous phase in the reactor is a gas phase, and a large amount of hydrogen is usually required to maintain the gas phase as continuous in the reactor. This is because, on one hand, the hydroisomerization de-waxing reaction is a slightly exothermic reaction, and in order to maintain the reaction temperature, excessive hydrogen is passed through the catalyst bed to take away the reaction heat; and on the other hand, in the gas-liquid-solid tri-phase reaction, maintaining a high hydrogen partial pressure favors the hydrogenation reaction, inhibits coke formation, and prolongs the life of catalyst. The excess hydrogen is usually pressurized by a hydrogen recycle compressor and then mixed with fresh hydrogen to again serve as the hydrogen feed for the reaction. This process can also be defined as a gas phase recycling trickle bed hydrogenation process. However, under the operation conditions, such a large amount of gaseous hydrogen provided for isomerization increases complexity and expense.

For example, the final effluent from the isomerization reactor is typically separated into a hydrogen-containing gas phase fraction and a liquid fraction, in order to supply and maintain the amount of hydrogen required for a continuous gas phase. The gas phase fraction usually enters a compressor and then recirculates back to the inlet of the reactor to contribute to the supply of a large amount of hydrogen, so as to maintain a continuous gas phase. The hydrogen recycle compressor serves as a key device for the hydrogenation process, the investment thereof represents a large proportion of the total cost of the hydrogenation equipment, and the energy consumption of the hydrogen heat exchanger system is high. If the hydrogen flow in the hydrogenation process can be reduced and the hydrogen circulating system and the hydrogen recycle compressor can be omitted, the cost of investment by enterprises can be saved.

In another aspect, although such three-phase systems typically require a large amount of hydrogen to maintain a continuous gas phase, the hydroisomerization reaction usually does not consume a large amount of hydrogen. In some cases it may consume a certain amount of hydrogen, for example in the isomerization reaction region, where minor cracking may occur. Thus, there is often a large amount of excess hydrogen present throughout the isomerization reaction system, forming a continuous gas phase which is however usually not required for the isomerization reaction. The excess hydrogen is separated from the final effluent, and then further processed by an additional separator and pipe. As discussed above, if this excess hydrogen is recycled to the inlet of the hydroisomerization reaction to supply hydrogen to the system, the hydrogen must be supplied to the reactor at a desired high pressure by going through a high pressure compressor.

The two-phase hydrogenation process (e.g., liquid materials and solid catalysts) is also proposed to, in some cases, convert certain hydrocarbon-containing materials to other hydrocarbons more valuable (liquid phase reactors can be used in this process). For example, by pre-saturation of hydrogen, two-phase systems (liquid phase reactors), rather than conventional three-phase systems, can be used to reduce sulfur in some hydrocarbon streams.

Other uses of liquid phase reactors are for hydrocracking and hydrotreatment of hydrocarbon-containing materials. However, hydrotreatment and hydrocracking require a significant amount of hydrogen to perform corresponding chemical conversions. Thus, even if all of these reactions proceed in a liquid phase system, a large amount of hydrogen is still required. Therefore, in order to maintain the hydrogen required for such a liquid phase hydrotreatment or hydrocracking reaction, it is necessary to introduce an additional diluent or solvent into the raw material of the existing liquid phase system to dilute the reaction components in the feed and reduce the temperature rise in the reactor. Thus, the diluent and the solvent should have greater hydrogen solubility than the raw materials, to ensure sufficient conversion in the liquid phase. However, these reaction systems often require larger, more complex, and more expensive liquid phase reactors to achieve a desired conversion.

Currently, the two-phase processes mainly include the IsoTherming technology of DuPont. The U.S. Pat. No. 6,881,326B2 and ZL200680018017.3 of the company disclose use of diluents or solvents to provide greater hydrogen solubility, wherein a product is used as the diluent or solvent. However, because of hydrocracking or hydrotreatment reactions, hydrogen consumption is large, resulting in a large throughput of product circulation.

U.S. Pat. No. 7,803,269B2 discloses a liquid-phase hydroisomerization process for hydroisomerization of Fischer-Tropsch synthetic oils or vegetable oils consisting of C8-C30 linear paraffins, so as to reduce the clouding point, pour point and solidification point. The hydroisomerization process is characterized by having low hydrogen consumption, avoiding product circulating, and not requiring supplementation of additional hydrogen in the hydroisomerization isomerization region. However, the process is not suitable for the hydroisomerization of mineral oil fractions or synthetic oils having a high dry point and/or a high aromatic content. Moreover, the process is not capable of hydrofining the hydroisomerized oil and cannot further saturate aromatics. Therefore, in order to improve the color and oxidation stability of the product, additional additives are required.

SUMMARY OF INVENTION

In order to overcome the above problems, an objective of the present invention is to provide a liquid-phase hydroisomerization system.

Another objective of the present invention is to provide a liquid-phase hydroisomerization process utilizing the above system.

Yet another objective of the present invention is to provide use of the liquid-phase hydroisomerization process described above for hydroisomerizing lubricant oil raw materials to produce lubricant base oils or for hydroisomerizing diesel oils to lower the solidification point and produce a diesel oil with a low solidification point.

In order to achieve the above objective, an embodiment of the present invention provides a liquid-phase hydroisomerization system, comprising:

a hydrogen-dissolving unit, a hydroisomerization reactor, and a fractionating column;

wherein the hydrogen-dissolving unit comprises an oil feed line, a hydrogen feed line and a hydrogen-oil-mixture line, the hydrogen-oil-mixture line is in communication with the bottom of the hydroisomerization reactor, and the top of the hydroisomerization reactor is in communication with the fractionating column;

the hydroisomerization reactor includes at least two catalyst beds therein, and an internal dissolved-hydrogen replenishment member is provided between at least one pair of two adjacent catalyst beds;

the internal dissolved-hydrogen replenishment member comprises a bottom sieve separating plate, a middle mixing space and a top separating plate, the top separating plate is provided with multiple liquid discharging pipes, and the middle mixing space is provided with a hydrogen inlet and a hydrogen outlet; hydrogen and oil are mixed in the middle mixing space, the liquid phase in which the hydrogen is dissolved is discharged through the liquid discharging pipes, and undissolved hydrogen gas is discharged through the hydrogen outlet.

In the liquid-phase hydroisomerization system described above, it is preferable that the fractionating column comprises, in addition to the target product, at least one cut fraction line in communication with the oil feed line.

In the liquid-phase hydroisomerization system described above, it is preferable that in the hydroisomerization reactor, there are 2 to 5 catalyst beds.

In the liquid-phase hydroisomerization system described above, it is preferable that the system further comprises a hydrofining reactor, provided before or after the hydroisomerization reactor;

if the hydrofining reactor is provided before the hydroisomerization reactor, the hydrogen-oil-mixture line is in communication with the bottom of the hydrofining reactor, the top of the hydrofining reactor is in communication with the bottom of the hydroisomerization reactor, and the top of the hydroisomerization reactor is in communication with the fractionating column;

if the hydrofining reactor is provided after the hydroisomerization reactor, the hydrogen-oil-mixture line is in communication with the bottom of the hydroisomerization reactor, the top of the hydroisomerization reactor is in communication with the bottom of the hydrofining reactor, the top of the hydrofining reactor is in communication with the fractionating column;

it is further preferable that the hydrofining reactor comprises at least two catalyst beds therein, and an internal dissolved-hydrogen replenishment member is provided between two adjacent catalyst beds;

it is more preferable that in the hydrofining reactor, there are 2 to 5 catalyst beds.

In the liquid-phase hydroisomerization system described above, the number of catalyst beds in each reactor can be adjusted according to the nature of the raw material, the processing amount of the reaction material, and the like.

An embodiment of the present invention further provides a liquid-phase hydroisomerization process using the above system, which comprises the steps of:

1) mixing oil and hydrogen in a hydrogen-dissolving unit to obtain a liquid mixture of hydrogen and oil;

2) feeding the mixture of hydrogen and oil to a subsequent hydroisomerization reactor and/or a hydrofining reactor to allow for a hydroisomerization reaction and/or a hydrofining reaction;

3) feeding the resultant obtained in step 2) to a fractionating column for fractionation, and obtaining a fractionated target product.

In the liquid-phase hydroisomerization process described above, on one hand, the oil and hydrogen are made into a pure liquid mixture of hydrogen and oil by a hydrogen-dissolving unit (a conventional gas-liquid mixer), such an operation that dissolves a part of hydrogen required for the reaction in oil in advance allows the hydroisomerization reaction to have a faster rate and a better reaction result; in addition, the mixture of hydrogen and oil is passed through the catalyst beds of the hydroisomerization reactor from the bottom up, forming an upstream liquid phase hydrogenating process.

In the hydroisomerization reaction, in order to ensure that the dissolved hydrogen in the liquid phase in the reactor is always saturated, there will be a small amount of excess gaseous hydrogen present at the reactor outlet, and meanwhile the liquid phase in the reactor is a continuous phase, with a small amount of gas phase being a dispersed phase. In order to prevent the dispersed gas phase from accumulating in a local part of the reactor and affecting the uniformity of the flow of the reaction stream, an upstream reactor (feeding from the bottom, discharging from the top) is selected. In an upstream reactor, the gas and liquid phases of the reaction stream flow through the catalyst beds from the bottom up, and the flow direction of the medium is consistent with the gas diffusion direction, which minimizes the possibility of local accumulation of gas in the reactor, and favors uniform distribution of the small amount of hydrogen. In contrast, a downstream reactor has a technical problem of small gas buoyancy and gas flow which is difficult to solve, and requires a gas discharge means provided between the beds to maintain a stable liquid level. In addition, compared with a downstream reactor, an upstream reactor has a high catalyst loading ratio, requires less internal members, and is a mature technology, in which the internal members occupy a small space, allowing a high use ratio of the space in the reactor, less maintenance work, a less pressure drop in the reactor, and less energy consumption.

In the hydroisomerization reaction, hydrogen is replenished to the mixture of hydrogen and oil by the internal dissolved-hydrogen replenishment member (the replenished hydrogen is basically fully dissolved in the oil, and compensates for the hydrogen that has reacted), so that the hydroisomerization region always has a substantially constant level of dissolved hydrogen (which can be maintained at ±5% of the dissolved amount of saturated hydrogen). In addition, the internal dissolved-hydrogen replenishment member also has an effect of absorbing a part of reaction heat from the bed above it to reduce the temperature rise of the beds. The liquid-phase hydroisomerization process provided by the present invention ensures a continuous isomerization reaction rate and an iso-paraffin yield by the above characteristics.

The liquid-phase hydroisomerization process provided by the present invention greatly reduces the amount of hydrogen used in the reaction system. The process subjects n-paraffins to an isomerization reaction of hydrocarbon raw materials in oils in a continuous liquid phase reaction region, rather than in a three-phase reaction system that requires a large amount of high-pressure hydrogen to maintain a continuous gas phase. In the above-described isomerization system for a continuous liquid phase reaction, by mixing a certain amount of hydrogen (at least a part of hydrogen) into hydrocarbon raw materials in advance and replenishing dissolved hydrogen in the isomerizing process, a continuous liquid phase and a continuously equilibrated reaction rate can be maintained in the hydroisomerization region.

In the liquid-phase hydroisomerization process provided by the present invention, when hydrogen is dissolved by a hydrogen-dissolving unit and/or is replenished by an internal dissolved-hydrogen replenishment member, the suitable amount of hydrogen to be dissolved and/or replenished can be selected according to the quality requirement and specific process requirements of oil. For example, when the amount of hydrogen required for the isomerization reaction is small, the hydrogen can be supplied mainly by the hydrogen-dissolving unit, and the amount of hydrogen replenished by the internal dissolved-hydrogen replenishment member may be reduced accordingly.

The liquid-phase hydroisomerization process provided by the present invention can reduce one of the clouding point, the pour point and the cold filter plugging point of hydrocarbon raw materials by the continuous liquid-phase hydroisomerization procedure.

In the liquid-phase hydroisomerization process described above, it is preferred that the oil is an oil fraction having a distillation range of 65° C. to 550° C.; more preferably, the oil fraction is one of, or a combination of more of, a hydrocracking tail oil, a catalytic diesel oil, a coking diesel oil, a straight-run diesel oil, a straight-run wax oil, a low-pressure oil fraction, a coking wax oil, a deasphalted oil and a synthetic oil; and even more preferably, the oil fraction is a hydrocracking tail oil.

In the liquid-phase hydroisomerization process described above, it is preferable that the hydrogen dissolved in the mixture of hydrogen and oil is in a saturated state or a supersaturated state. The amount of dissolved hydrogen in the mixture of hydrogen and oil can be adjusted according to different properties of the oil. When the oil needs more hydrogen consumption, the amount of dissolved hydrogen can be adjusted to the supersaturated state.

In the liquid-phase hydroisomerization process described above, it is preferable that the amount of dissolved hydrogen in the continuous liquid phase in the hydroisomerization reaction and/or the hydrofining reaction is sufficient to maintain a stable reaction as needed.

In the liquid-phase hydroisomerization process described above, it is preferable that the catalyst used in the hydroisomerization reaction is usually related to the nature of raw materials being processed, and is typically a conventional noble-metal catalyst or a base metal catalyst. The noble metal catalyst may be a lubricant oil hydroisomerization catalyst such as PIC-802 and PIC-812 produced by Beijing Sanju Environmental Protection & New Materials Co., Ltd.; the base metal catalyst may be a diesel isomerizing and solidification point-dropping catalyst such as HIDW produced by Fushun Petrochemical Company Catalyst Factory of China National Petroleum Corporation.

In the liquid-phase hydroisomerization process described above, it is preferable that the conditions of the hydroisomerization reaction are: a reaction pressure of 6.0 MPa to 16.0 MPa, a reaction temperature of 320° C. to 395° C., and a volume space velocity of 0.2 $h^{-1}$ to 2.01 $h^{-1}$.

In the liquid-phase hydroisomerization process described above, it is preferable that the conditions of the hydrofining reaction are: a reaction pressure of 6.0 MPa to 16.0 MPa, a reaction temperature of 220° C. to 385° C., and a volume space velocity of 0.2 $h^{-1}$ to 3.0 $h^{-1}$.

In the liquid-phase hydroisomerization process described above, the specific operations of hydroisomerization and hydrofining can be carried out according to existing techniques in the art, such as a hydrogenation process of serial isodewaxing and hydrofining (two hydrogenation reactors), or a hydrogenation process of serial hydrofining-isomerization and solidification point-decreasing (two hydrogenation reactors).

In the liquid-phase hydroisomerization process described above, it is preferable that the process further comprises the step of feeding one or more fractions obtained after the fractionation other than the desired product to the oil. In this scheme, the hydrocarbon raw materials (or at least a part thereof) in the oil are mixed with the fractions from the fractionating column, dissolve hydrogen through a hydrogen-dissolving unit, and then enter the continuous liquid-phase hydroisomerization region to react. This scheme uses a part of fractions as a liquid phase circulating material to assist hydrogen-dissolving, which actually increases the ratio of dissolved hydrogen to reactant in the liquid phase isomerization region; and while the hydrogen is consumed as the reaction proceeds, a certain amount of hydrogen is replenished to the reaction region by the internal dissolved-hydrogen replenishment member, and the liquid phase circulating material can still dissolve a certain amount of hydrogen in the reaction region. In specific applications of the liquid-phase hydroisomerization process described above, whether there is a need for product circulation and the nature of the circulating oil can be determined according to the actual situation of hydroisomerization to ensure the product yield and selectivity.

In the liquid-phase hydroisomerization process described above, in the liquid phase materials in the hydroisomerization reactor and/or the hydrofining reactor, hydrogen is predominantly in a dissolved state (substantially free of hydrogen bubbles or having only a small amount of bubbles). In the prior art, as disclosed in CN103119133A, "hydrogen is present in the form of slugs or bubbles in the outside or inside of the liquid-filled space", and "hydrogen should be present at a sufficiently low concentration to ensure a continuous liquid phase in the hydrogenation reactor, but the concentration is high enough to provide sufficient hydrogen for the hydrocarbon feed in the hydrogenation operation". According to the above description, in this patent publication, hydrogen is present in the form of gas or bubbles (which is substantially different from the present invention), and hydrogen present in the form of bubbles indicates that the technique employed in this patent application requires use of a hydrogen recycle compressor, as described in the background art of the present invention, which results in a higher cost. In addition, CN103805240A discloses the term "liquid product circulating oil", but concerns circulating of the product from a gas-liquid reverse flow reactor; and the second reactor in this patent application is not a liquid phase reactor but a gas-liquid reverse flow reactor, and therefore the properties of the final reaction product as well as the reaction conditions are different from those of a pure liquid phase reactor.

In the liquid-phase hydroisomerization system described above, it is preferable that the hydrogen discharged from the internal dissolved-hydrogen replenishment member enters the hydrogen circulation system.

An embodiment of the invention also provides use of the liquid-phase hydroisomerization process described above for hydroisomerizing lubricant oil raw materials to produce lubricant base oils or hydroisomerizing diesel oils to lower the solidification point and produce a diesel oil with a low solidification point.

Compared with the prior art, the present invention provides a liquid-phase hydroisomerization system or process, which omits the hydrogen recycle compressor, simplifies the oil hydrogenation process, and reduces the investment cost and operation risk.

REFERENCE NUMBERS

1 Hydrogen line; 2 Oil feed line; 3 Gas-liquid mixer; 4 Hydroisomerization reactor; 5. Hydrofining reactor; 6 Fractionating column; 7 Product line; 8 Circulating pump.

DETAILED DESCRIPTION OF INVENTION

The technical solutions of the present invention will now be described in detail in order to provide a better understanding of the technical features, objectives and advantages of the present invention, but the following description is not to be construed as limiting the scope of the invention.

The raw materials used in Examples 1-3 are shown in Table 1:

TABLE 1

Properties of the feedstock oils A, B and C

| Item | | Feedstock oil A | Feedstock oil B | Feedstock oil C |
|---|---|---|---|---|
| Feedstock oil | | 200SN pre-refined oil | 650SN pre-refined oil | hydrocracking tail oil |
| Density (20° C.), g/cm$^3$ | | 0.8646 | 0.8580 | 0.8367 |
| Viscosity at 100° C., mm$^2$/S | | 5.204 | 8.73 | 4.34 |
| Viscosity at 40° C., mm$^2$/S | | 27.92 | — | 18.9 |
| Viscosity index | | 118 | 140 | 142.7 |
| Solidification point (° C.) | | 2.2 | 58 | 30.7 |
| Total sulfur, μg/g | | <6 | <6 | <6 |
| Total nitrogen, μg/g | | <2 | <2 | <2 |
| Distillation range (° C.) | HK/10% | 340/393 | 412/468 | 323/389 |
| | 30%/50% | 412/426 | 491/503 | 411/427 |
| | 70%/90% | 440/458 | 515/532 | 448/484 |
| | 95%/KK | 464/476 | 540/556 | 501/515 |

Example 1

Figure 1:
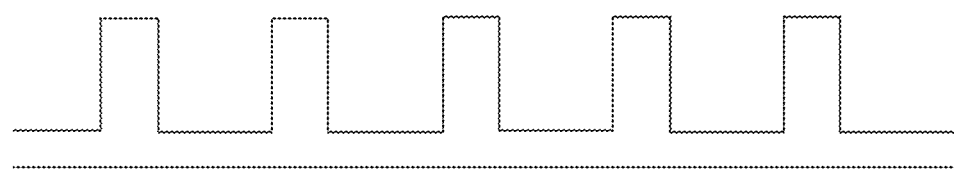
FIG. 1 is a schematic view of the structure of the internal dissolved-hydrogen replenishment member in Example 1.

This Example provides a liquid-phase hydroisomerization system, which comprises (wherein the first reactor is a hydroisomerization reactor, and the second reactor is a hydrofining reactor):

a gas-liquid mixer 3, a hydroisomerization reactor 4, a hydrofining reactor 5 and a fractionating column 6; wherein the hydroisomerization reactor 4 is provided with three catalyst beds, and an internal dissolved-hydrogen replenishment member is provided between each pair of adjacent catalyst beds, with each catalyst bed filled with a hydroisomerization de-waxing catalyst;

the internal dissolved-hydrogen replenishment member (the structure thereof is shown in FIG. 1) comprises a bottom sieve separating plate, a middle mixing space and a top separating plate, the top separating plate is provided with multiple liquid discharging pipes, and the middle mixing space is provided with a hydrogen inlet and a hydrogen outlet; hydrogen and oil are mixed in the middle mixing space, the liquid phase in which hydrogen is dissolved is discharged through the liquid discharging pipes, and undissolved hydrogen is discharged through the hydrogen outlet;

the hydrofining reactor 5 is provided with three catalyst beds, and an internal dissolved-hydrogen replenishment member is provided between each pair of adjacent catalyst beds, with each catalyst bed filled with a hydrofining catalyst;

the hydrogen line 1 is divided into three branches, namely the first branch of hydrogen, the second branch of hydrogen, and the third branch of hydrogen, wherein the first branch of hydrogen is in communication with the oil feed line 2, the second branch of hydrogen is divided into two parts which are in communication with the two internal dissolved-hydrogen replenishment members in the hydroisomerization reactor 4, respectively, and the third branch of hydrogen is divided into two parts which are in communication with the two internal dissolved-hydrogen replenishment members in the hydrofining reactor 5, respectively;

the oil feed line 2 is in communication with the gas-liquid mixer 3, the gas-liquid mixer 3 is in communication with feed inlet at the bottom of the hydroisomerization reactor 4 through a hydrogen-oil-mixture line, the feed outlet on top of the hydroisomerization reactor 4 is in communication with the feed inlet at the bottom of the hydrofining reactor 5, the feed outlet on top of the hydrofining reactor 5 is in communication with the rectification column 6, and the rectification column 6 is provided with a product line 7 and a non-product fraction line, wherein the product line 7 is directed out of the boundary zone, the non-product fraction line is in communication with the inlet of the circulating pump 8, and the outlet of the circulating pump 8 is in communication with the oil feed line 2.

Figure 2:
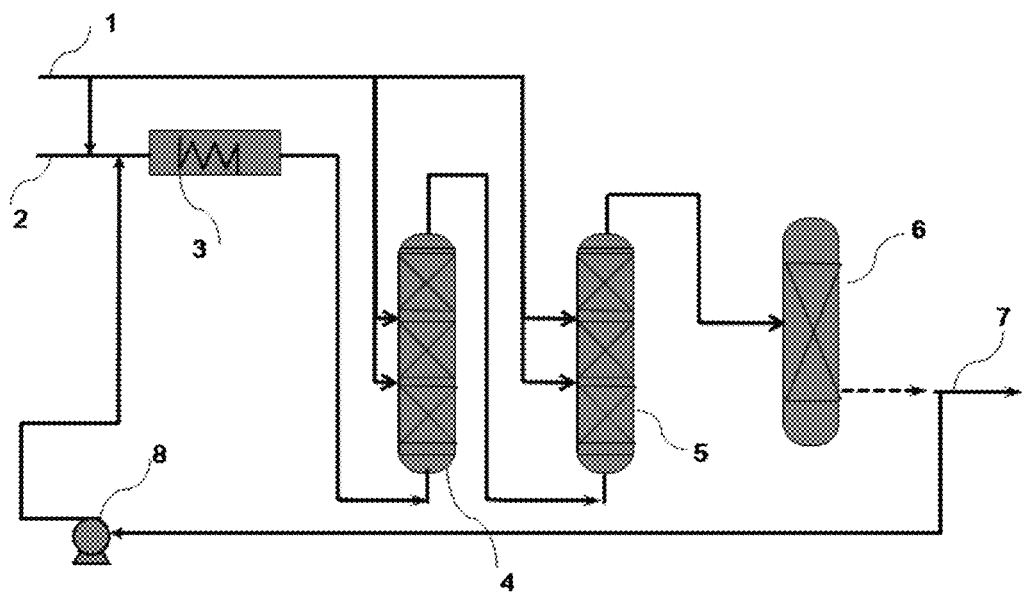
FIG. 2 is a schematic view of the liquid-phase hydroisomerization process in Example 1.

The liquid-phase hydroisomerization process:

a liquid-phase hydroisomerization process using the process system described above (the schematic view of the process is shown in FIG. 2), which comprises the following steps:

1) mixing the feedstock A and hydrogen in the gas-liquid mixer 3 to form a mixture of hydrogen and oil in a pure liquid state, and feeding the mixture of hydrogen and oil to the hydroisomerization reactor 4 from the bottom;

2) in the hydroisomerization reactor 4, allowing the mixture of hydrogen and oil to undergo a hydroisomerization reaction to obtain a hydroisomerization reaction product, wherein the processing conditions of the hydroisomerization were: a hydrogen partial pressure of 12.2 MPa, a reaction temperature of 320° C., and a volume space velocity of 1.2 $h^{-1}$; and the isodewaxing catalyst used in the reaction was the noble metal catalyst PIC-812;

3) feeding the hydroisomerization reaction product to the hydrofining reactor 5 from the bottom for hydrofining, and feeding the product of hydrofining to the fractionating column 6, wherein the processing conditions of the hydrofining were: a hydrogen partial pressure of 12.2 MPa, a reaction temperature of 220° C., and a volume space velocity of 2.0 $h^{-1}$;

4) circulating the 2 cSt (centistoke) or 6 cSt fraction obtained after cutting the mixed product from the fractionating column 6, while reserving the target product as the other fraction (if the 2 cSt fraction is the target product, then the 6 cSt fraction is used as the circulating oil), wherein the properties of the product are shown in Table 2.

TABLE 2

Properties of the product obtained in this Example

| Item | | Example 1 |
|---|---|---|
| Liquid yield, % | | 99.8 |
| Total yield of base oil, % (uncirculated) | | 88.9 |
| Yield of 6 cSt base oil, % (circulated) | | 81.1 |
| Properties of 6 cSt base oil | pour point (° C.) | −18 |
| | clouding point (° C.) | −17 |
| | Viscosity at 100° C., mm²/s | 6.163 |
| | Viscosity index | 108 |

As can be seen from Table 2, the system provided by this Example gave a yield of base oil of 88.9%, and can produce 6 cSt base oil at a maximum yield.

Example 2

This Example provides a liquid-phase hydroisomerization process, which uses a system similar to that in Example 1, except that the hydroisomerization reactor and the hydrofining reactor are each provided with four catalyst beds, and an internal dissolved-hydrogen replenishment member is provided between each pair of two adjacent catalyst beds. The process includes the following steps:

1) mixing the feedstock oil B and hydrogen in the gas-liquid mixer 3 to form a mixture of hydrogen and oil in a pure liquid state, and feeding the mixture of hydrogen and oil to the hydroisomerization reactor 4 from the bottom;

2) in the hydroisomerization reactor 4, allowing the mixture of hydrogen and oil to undergo a hydroisomerization reaction to obtain a hydroisomerization reaction product, wherein the processing conditions of the hydroisomerization were: a hydrogen partial pressure of 12.2 MPa, a reaction temperature of 365° C., and a volume space velocity of 0.85 $h^{-1}$; and the isodewaxing catalyst used in the reaction was the noble metal catalyst PIC-812;

3) feeding the hydroisomerization reaction product to the hydrofining reactor 5 from the bottom for hydrofining, and feeding the product of hydrofining to the fractionating column 6, wherein the processing conditions of the hydrofining were: a hydrogen partial pressure of 12.2 MPa, a reaction temperature of 230° C., and a volume space velocity of 1.42 $h^{-1}$;

4) circulating the 2 cSt (centistoke) fraction obtained after cutting the mixed product from the fractionating column 6, while reserving the 10 cSt fraction, wherein the properties of the product are shown in Table 3.

TABLE 3

Properties of the product obtained in Example 2

| Item | | Example 2 |
|---|---|---|
| Liquid yield, % | | 96.7 |
| Total yield of base oil, % (uncirculated) | | 81.0 |
| Yield of 10 cSt base oil, % (circulated) | | 73.4 |
| Properties of 10 cSt base oil | pour point (° C.) | −18 |
| | clouding point (° C.) | −5 |
| | Viscosity at 100° C., mm²/s | 10.77 |
| | Viscosity index | 122 |

As can be seen from Table 3, the system gave a yield of base oil of 81%, and can produce 10 cSt base oil.

Example 3

This Example provides a liquid-phase hydroisomerization system and process, and the system (comprising the hydroisomerization reactor only) includes:

a gas-liquid mixer 3, a hydroisomerization reactor 4, and a fractionating column 6; wherein the hydroisomerization reactor 4 is provided with five catalyst beds, and an internal dissolved-hydrogen replenishment member is provided between each pair of adjacent catalyst beds, with each catalyst bed filled with a hydroisomerization de-waxing catalyst;

the internal dissolved-hydrogen replenishment member comprises a bottom sieve separating plate, a middle mixing space and a top separating plate, the top separating plate is provided with multiple liquid discharging pipes, and the middle mixing space is provided with a hydrogen inlet and a hydrogen outlet; hydrogen and oil are mixed in the middle mixing space, the liquid phase in which hydrogen is dissolved is discharged through the liquid discharging pipes, and undissolved hydrogen is discharged through the hydrogen outlet;

the hydrogen line 1 is divided into two branches, namely the first branch of hydrogen and the second branch of hydrogen, wherein the first branch of hydrogen is in communication with the oil feed line 2, and the second branch of hydrogen is divided into four parts which are in communication with the four internal dissolved-hydrogen replenishment members in the hydroisomerization reactor 4, respectively;

the oil feed line 2 is in communication with the gas-liquid mixer 3, the gas-liquid mixer 3 is in communication with the feed inlet at the bottom of the hydroisomerization reactor 4 through the hydrogen-oil-mixture line, the feed outlet on top of the hydroisomerization reactor 4 is in communication with the rectification column 6, and the rectification column 6 is provided with a product line 7 and a non-product fraction line, wherein the product line 7 is directed out of the boundary zone, and the product in the non-product fraction line is not circulated.

The Liquid-Phase Hydroisomerization Process:

a liquid-phase hydroisomerization process using the above system, comprising the following steps:

1) mixing the feedstock oil C and hydrogen in the gas-liquid mixer 3 to form a mixture of hydrogen and oil in a pure liquid state, and feeding the mixture of hydrogen and oil to the hydroisomerization reactor 4 from the bottom;

2) in the hydroisomerization reactor 4, allowing the mixture of hydrogen and oil to undergo a hydroisomerization reaction to obtain a hydroisomerization reaction product, wherein the processing conditions of the hydroisomerization were: a hydrogen partial pressure of 15.6 MPa, a reaction temperature of 340° C., and a volume space velocity of 1.5 $h^{-1}$; and the isodewaxing catalyst used in the reaction was the noble metal catalyst PIC-812;

3) subjecting the mixed product from the fractionating column 6 to different true-boiling-point cutting processes (three of the process schemes are provided in Table 4) to produce different lubricating oil products, such as 2 cSt (centistoke), 4 cSt (centistoke), 5 cSt (centistoke), 6 cSt (centistoke), and 8 cSt (centistoke), the properties of which are shown in Table 4; wherein all the fractionated products were not circulated.

As can be seen from the data in Table 4, the processing technology provided in the Example gave a yield of base oil from the hydrocracking tail oil of 80% or more, and can produce 2 cSt, 4 cSt II/II+, 5 cSt III, 6 cSt III, and 8 cSt III base oils according to different processing schemes.

TABLE 4

Properties of the products obtained by different processing schemes of Example 3

| Yield, % | Processing scheme 1 | Processing scheme 2 | Processing scheme 3 |
|---|---|---|---|
| 2 cSt | 9.46 | 9.70 | 7.08 |
| 4 cSt II | / | 27.34 | / |
| 4 cSt II+ | 58.35 | / | / |
| 5 cSt III | / | / | 83.07 |
| 6 cSt III | / | 53.11 | / |
| 8 cSt III | 22.34 | / | / |
| Total yield | 100 | 100 | 100 |
| Total base oil yield | 90.15 | 90.15 | 90.15 |

Example 4

This Example provides a liquid-phase hydroisomerization system and process, and the system comprises (wherein the first reactor is a hydrofining reactor, and the second reactor is a hydroisomerization reactor):

a gas-liquid mixer 3, a hydroisomerization reactor 4, a hydrofining reactor 5, and a fractionating column 6; wherein the hydroisomerization reactor 4 is provided with three catalyst beds, and an internal dissolved-hydrogen replenishment member is provided between each pair of adjacent catalyst beds, with each catalyst bed filled with a hydroisomerization de-waxing catalyst;

the internal dissolved-hydrogen replenishment member comprises a bottom sieve separating plate, a middle mixing space and a top separating plate, the top separating plate is provided with multiple liquid discharging pipes, and the middle mixing space is provided with a hydrogen inlet and a hydrogen outlet; hydrogen and oil are mixed in the middle mixing space, the liquid phase in which hydrogen is dissolved is discharged through the liquid discharging pipes, and undissolved hydrogen is discharged through the hydrogen outlet;

the hydrofining reactor 5 is provided with three catalyst beds, and an internal dissolved-hydrogen replenishment member is provided between each pair of adjacent catalyst beds, with each catalyst bed filled with a hydrofining catalyst;

the hydrogen line 1 is divided into three branches, namely the first branch of hydrogen, the second branch of hydrogen, and the third branch of hydrogen, wherein the first branch of hydrogen is in communication with the oil feed line 2, the second branch of hydrogen is divided into two parts which are in communication with the two internal dissolved-hydrogen replenishment members in the hydroisomerization reactor 4, respectively, and the third branch of hydrogen is divided into two parts, and in communication with the two internal dissolved-hydrogen replenishment members in the hydrofining reactor 5, respectively;

the oil feed line 2 is in communication with the gas-liquid mixer 3, the gas-liquid mixer 3 is in communication with the feed inlet at the bottom of the hydrofining reactor 5 through a hydrogen-oil-mixture line, the feed outlet on top of the hydrofining reactor 5 is in communication with the feed inlet at the bottom of the hydroisomerization reactor 4, the feed outlet on top of the hydroisomerization reactor 4 is in communication with the rectification column 6, and the rectification column 6 is provided with a product line 7 and a non-product fraction line, wherein the product line 7 is directed out of the boundary zone, the non-product fraction line is in communication with the inlet of the circulating pump 8, and the outlet of the circulating pump 8 is in communication with the oil feed line 2.

The Liquid-Phase Hydroisomerization Process:

a liquid-phase hydroisomerization process using the above system, comprising the following steps:

1) mixing the feedstock oil D and hydrogen in the gas-liquid mixer 3 to form a mixture of hydrogen and oil in a pure liquid state, and feeding the mixture of hydrogen and oil to the hydrofining reactor 5 from the bottom;

2) in the hydrofining reactor 5, allowing the mixture of hydrogen and oil to undergo a hydrofining reaction, wherein the processing conditions of the hydrofining were: a pressure of the reaction system of 6.5 MPa, a reaction temperature of 355° C., and a space velocity of 1.5 $h^{-1}$;

3) feeding the product of the hydrofining reaction to the hydroisomerization reactor 4 for a hydroisomerization reaction to obtain the product of the hydroisomerization reaction, wherein the processing conditions of the hydroisomerization were: a pressure of the reaction system of 6.5 MPa, a reaction temperature of 350° C., and a space velocity of 1.5 $h^{-1}$; wherein the catalyst for isomerization and pour point-dropping used in the reaction was a base metal catalyst HIDW, and the product was not circulated. The feedstock oil D and the properties of the product are listed in Table 5.

TABLE 5

Properties of the feedstock D and the product

| Properties of oil | Feedstock D | Product oil |
|---|---|---|
| Composition, % | Straight-run Diesel: Catalytic Diesel = 55:45 | |
| Density, g/cm$^3$ | 0.8395 | 0.8265 |
| Distillation range (° C.) | 176-355 | 166-350 |
| Sulfur content, μg/g | 946 | 6.4 |
| Nitrogen content, μg/g | 997 | 9.6 |
| Cetane number | 48.8 | 50.0 |
| Solidification point (° C.) | −4.0 | −35.7 |
| Diesel yield, % | / | 89.7 |

As can be seen from Table 5, the processing technology results in a diesel yield of 89%, lowers the solidification point by 30° C. or more, and can produce a diesel oil with a solidification point as low as −35° C.

The invention claimed is:

1. A liquid-phase hydroisomerization system, comprising: a hydrogen-dissolving unit, a hydroisomerization reactor, and a fractionating column;
wherein the hydrogen-dissolving unit comprises an oil feed line, a hydrogen feed line and a hydrogen-oil-mixture line, the hydrogen-oil-mixture line is in communication with the bottom of the hydroisomerization reactor, and the top of the hydroisomerization reactor is in communication with the fractionating column;
the hydroisomerization reactor includes at least two catalyst beds, and an internal dissolved-hydrogen replenishment member is provided between at least one pair of two adjacent catalyst beds;
the internal dissolved-hydrogen replenishment member comprises a bottom sieve separating plate, a middle mixing space and a top separating plate, the top separating plate is provided with multiple liquid discharging pipes, and the middle mixing space is provided with a hydrogen inlet and a hydrogen outlet; hydrogen and oil are mixed in the middle mixing space, the liquid phase in which the hydrogen is dissolved is discharged through the liquid discharging pipes, and undissolved hydrogen gas is discharged through the hydrogen outlet.

2. The liquid-phase hydroisomerization system according to claim 1, wherein the fractionating column comprises at least one cut fraction line in communication with the oil feed line.

3. The liquid-phase hydroisomerization system according to claim 1, wherein in the hydroisomerization reactor, there are 2 to 5 catalyst beds.

4. The liquid-phase hydroisomerization system according to claim 1, wherein the system further comprises a hydrofining reactor, provided before or after the hydroisomerization reactor;
if the hydrofining reactor is provided before the hydroisomerization reactor, the hydrogen-oil-mixture line is in communication with the bottom of the hydrofining reactor, the top of the hydrofining reactor is in communication with the bottom of the hydroisomerization reactor, and the top of the hydroisomerization reactor is in communication with the fractionating column;
if the hydrofining reactor is provided after the hydroisomerization reactor, the hydrogen-oil-mixture line is in communication with the bottom of the hydroisomerization reactor, the top of the hydroisomerization reactor is in communication with the bottom of the hydrofining reactor, the top of the hydrofining reactor is in communication with the fractionating column.

5. The liquid-phase hydroisomerization system according to claim 4, wherein the hydrofining reactor comprises at least two catalyst beds, and an internal dissolved-hydrogen replenishment member is provided between two adjacent catalyst beds.

6. The liquid-phase hydroisomerization system according to claim 5, wherein in the hydrofining reactor, there are 2 to 5 catalyst beds.

7. A liquid-phase hydroisomerization process using the system according to claim 1, wherein the process comprises:
1) mixing oil and hydrogen in a hydrogen-dissolving unit to obtain a liquid mixture of hydrogen and oil;
2) feeding the mixture of hydrogen and oil to a subsequent hydroisomerization reactor and/or a hydrofining reactor to allow for a hydroisomerization reaction and/or a hydrofining reaction; and
3) feeding the resultant obtained in 2) to a fractionating column for fractionation, and obtaining a fractionated target product.

8. The process according to claim 7, wherein the oil is an oil fraction having a distillation range of 65° C. to 550° C.

9. The process according to claim 8, wherein the oil fraction includes one of, or a combination of more of, a hydrocracking tail oil, a catalytic diesel oil, a coking diesel oil, a straight-run diesel oil, a straight-run wax oil, a low-pressure oil fraction, a coking wax oil, a deasphalted oil and a synthetic oil.

10. The process according to claim 9, wherein the oil fraction is a hydrocracking tail oil.

11. The process according to claim 7, wherein the hydrogen dissolved in the mixture of hydrogen and oil is in a saturated state or a supersaturated state.

12. The process according to claim 7, wherein the conditions of the hydroisomerization reaction are: a reaction pressure of 6.0 MPa to 16.0 MPa, a reaction temperature of 320° C. to 395° C., and a volume space velocity of 0.2 h$^{-1}$ to 2.0 h$^{-1}$; and
the conditions of the hydrofining reaction are: a reaction pressure of 6.0 MPa to 16.0 MPa, a reaction temperature of 220° C. to 385° C., and a volume space velocity of 0.2 h$^{-1}$ to 3.0 h$^{-1}$.

13. The process according to claim 7, wherein the process further comprises introducing one or more fractions obtained after the fractionation other than the target product into the oil.

14. The liquid-phase hydroisomerization system according to claim 2, wherein the system further comprises a hydrofining reactor, provided before or after the hydroisomerization reactor;
if the hydrofining reactor is provided before the hydroisomerization reactor, the hydrogen-oil-mixture line is in communication with the bottom of the hydrofining reactor, the top of the hydrofining reactor is in communication with the bottom of the hydroisomerization reactor, and the top of the hydroisomerization reactor is in communication with the fractionating column;
if the hydrofining reactor is provided after the hydroisomerization reactor, the hydrogen-oil-mixture line is in communication with the bottom of the hydroisomerization reactor, the top of the hydroisomerization reactor is in communication with the bottom of the hydrofining reactor, the top of the hydrofining reactor is in communication with the fractionating column.

15. The liquid-phase hydroisomerization system according to claim 3, wherein the system further comprises a hydrofining reactor, provided before or after the hydroisomerization reactor;
- if the hydrofining reactor is provided before the hydroisomerization reactor, the hydrogen-oil-mixture line is in communication with the bottom of the hydrofining reactor, the top of the hydrofining reactor is in communication with the bottom of the hydroisomerization reactor, and the top of the hydroisomerization reactor is in communication with the fractionating column;
- if the hydrofining reactor is provided after the hydroisomerization reactor, the hydrogen-oil-mixture line is in communication with the bottom of the hydroisomerization reactor, the top of the hydroisomerization reactor is in communication with the bottom of the hydrofining reactor, the top of the hydrofining reactor is in communication with the fractionating column.

16. The liquid-phase hydroisomerization system according to claim 14, wherein the hydrofining reactor comprises at least two catalyst beds, and an internal dissolved-hydrogen replenishment member is provided between two adjacent catalyst beds.

17. The liquid-phase hydroisomerization system according to claim 16, wherein in the hydrofining reactor, there are 2 to 5 catalyst beds.

18. The liquid-phase hydroisomerization system according to claim 15, wherein the hydrofining reactor comprises at least two catalyst beds, and an internal dissolved-hydrogen replenishment member is provided between two adjacent catalyst beds.

19. The liquid-phase hydroisomerization system according to claim 18, wherein in the hydrofining reactor, there are 2 to 5 catalyst beds.

* * * * *